United States Patent Office 3,826,670
Patented July 30, 1974

3,826,670
ENCAPSULATION OF ORGANIC PIGMENTS
Thomas C. Rees, Park Forest, Ill., assignor to The Sherwin-Williams Company, Cleveland, Ohio
No Drawing. Filed Nov. 7, 1972, Ser. No. 302,693
Int. Cl. C08h 17/14
U.S. Cl. 106—308 Q  17 Claims

ABSTRACT OF THE DISCLOSURE

Novel pigments having improved heat and bleed resistance are made by precipitating an ionically-crosslinked linear polymeric acid salt of a polyvalent metal on a solid organic pigment core. The polymer-treated pigment is encapsulated with a hydrated metal oxide, which provides desirable chemical and physical properties for the pigment. The intermediate layer of polymeric salt can be formed in situ on the solid organic core by slurrying the pigment core in an aqueous solution of an ionized polycarboxylic acid polymer and precipitating the polymer by ionic crosslinking with a polyvalent metal, e.g. aluminum. The intermediate polymeric metal salt provides excellent adhesion for the subsequent application of hydrated metal oxide, e.g. silica.

Background of the Invention

This invention relates to improvements in the field of coated or encapsulated pigments, especially for pigments for use in protective and decorative coatings, inks and mass coloration of plastics. In particular, it provides novel methods and compositions wherein a finely divided organic pigment core is surface treated with a stabilizing coating. Such surface treatment, especially with hydrated silica, has drawn considerable interest from prior workers because of the improved properties which are obtainable. Chemically active organic pigments are particularly enhanced by such treatments. Color retention, chemical inertnes, thermal stability, dispersibility in liquid media and resistance to bleeding by strong solvents have been sought as desirable pigment properties.

The use of amorphous metal oxides or hydroxides as surface treating materials for pigment manufacture is increasing. Precipitated silica has gained great favor as an encapsulating material for various pigments. Oxide and hydroxide coatings of titanium, zirconium, and mixtures of silica with alumina and other metal oxides and hydroxides are also known. Since silica-treated pigments have received the most attention, the discussion will be focused on this type of encapsulated particle. Several methods for providing a hydrated metal oxide or hydroxide coating on a pigment core are known. U.S. Pats. 2,886,366, 3,370,-971, 3,383,718, and 3,470,007 describe the precipitation of silica on various substrates.

In the prior art methods, substantial difficulty has been encountered in obtaining good adhesion of the precipitated silica directly to an organic pigment core. Various pretreatments of the substrate particle have been attempted, such as coating the core with a thin layer of aluminum or chromium salts; however little success has been had in the application of silica to organic pigment substrates in general Attempts to obtain chemical inertness, dispersibility, thermal stability, and bleed resistance have generally failed when the hydrated metal oxide is precipitated directly on the organic substrate, with or without the prior art pretreatment.

Brief Summary of the Invention

A novel composite pigment and process of manufacture has been found which provides an encapsulated organic pigment having excellent chemical inertness, dispersibility, thermal stability, and bleed resistance. The pigment includes a core of solid organic material having a particle size in the range of about 0.1 to 10 microns, an intermediate layer of ionically crosslinked polymeric salt and a skin consisting essentially of dense, amorphous, hydrated oxide or hydroxide of silicon, titanium or zirconium. The polymeric salt may be formed in situ by reaction of a water soluble salt of a polycarboxylic acid with a polyvalent metal compound such as acid salts of aluminum, chromium, or the alkaline earth metals. Preferably, the polymer is a linear, water soluble polyelectrolyte having an acid value of at least about 50. Addition polymers of $\alpha,\beta$-ethylenically unsaturated carboxylic acids are satisfactory. The intermediate layer is precipitated onto the organic pigment core in an aqueous slurry of the pigment in the polycarboxylic reaction media. The amount of polycarboxylic salt is equal to about 5 to 100 parts per 100 parts of pigment core.

The hydrated metal oxide skin, preferably amorphous silica, can be provided by several known processes. This layer can be formed on the polycarboxylic intermediate layer by reaction of an alkaline silicate with a strong mineral acid while slurrying the pigment in an aqueous medium. This layer may be from about 10 to 100 parts hydrated metal oxide per 100 parts of pigment core.

Detailed Description of the Invention

The organic pigment core which constitutes the substrate of this composite pigment can be one of many classes of pigmentary compounds. These include the azo and diazo compounds, phthalocyanines, acridines, quinacridones, etc. Specific pigments which can benefit from treatment according to the present invention are toluidine red, hansa yellows, BT red, copper phthalocyanine blue, and polychlorinated phthalocyanines. Other pigments which may benefit from the treatment include benzidine yellows, benzidine oranges, pyrazalone orange, para red, pyrazalone red, dinitraniline orange, lithol reds, lithol rubine, parachlor red, BON Rubine, naphthol reds, dioxazines, isoindolinones, and alkali blue. The process may be modified to accommodate the particular organic pigment core. These pigments should be chemically resistant to the conditions of treatment, especially to attack by alkaline or acidic reaction media.

The particle size can vary from very small near-collodial particles of about 0.1 micron (100 millimicrons) up to particles having a maximum average size of about 10 microns. Those particles having an average size of about 0.5 to 5 microns are preferred as solid organic cores for the composite pigments. The physical form of the pigment can be spherical, ellipsoidal, plate-like, fibrous or elongated. Also aggregates of smaller particles can be treated. The core can be crystalline or amorphous in structure, or it can be multiphase—so long as the core is solid at ambient temperatures and under the usual conditions of treatment. The core material may be available as powder or dispersed in water or other liquid. The starting material should be in such a state of division as to permit the pigment particles to be dispersed in aqueous media by stirring or simple agitation. These materials should be essentially insoluble in water, i.e., less than 1% soluble under the usual conditions of treatment. Mixtures of organic materials may be used in the core particles.

Several methods of applying the outer coating are known: (1) simultaneous but separate addition of a soluble silicate and a mineral acid, (2) addition of a silicic acid solution freshly prepared by deionizing a sodium silicate solution with a cation-exchange resin, and (3) addition of sodium silicate solution to the pigment slurry, followed by addition of sulfuric acid.

There are certain critical conditions which must be observed during the treatment by any of these methods. To obtain the desired dense silica coatings on the pigment particles, the pH of the slurry at the point of addition of the silica-forming ingredients to the mixture must be at least above pH 6.0 and preferably in the range of 9.0 to 9.5. Furthermore, the temperature at this same point must be at least above 60° C. and preferably above 75° C. In many cases it is preferred that the temperature be about 90° C. When the pH is allowed to go below about 6.0 or the temperature significantly below 60° C., there is a pronounced tendency for the silica to precipitate in an undesired porous, gel-like structure.

The above-mentioned methods all result in the deposition of at least the major part of the silica as the desired amorphous continuous film on the surface of the pigment particles in the slurry. In all of these methods it is assumed that the pigment particles are well dispersed in sufficient water to give a fluid, easily-stirrable starting slurry, and preferably have been deagglomerated by intense shear. Such a slurry can result directly from the preparation of the pigment as described followed by suitable washing, or it can be a reconstituted slurry made either by redispersing a dry pigment in water. A convenient starting slurry can contain approximately 5 to 25% pigment soilds, the balance being water, but this concentration is not critical. It is desirable that the initial pigment slurry be essentially free of water soluble raw material excesses, such as are normally washed out in the manufacturing filtration step.

The amount of silica deposited onto the treated pigment core may vary considerably. It is preferred that about 25 to 50 parts silica (based on $SiO_2$) content be deposited. However, smaller amounts may be used, especially where a thicker intermediate layer is applied. For instance, where the intermediate layer is relatively thick, say more than 50 parts per 100 parts of pigment core, then an less thick silica layer, say 10 to 25 parts per 100 parts of pigment core, may be used. Expressed as a weight ratio of metal oxide to pigment core, the amount of silica may vary from about 0.1:1 to 1:1. Products having an outer layer consisting essentially of hydrated silica can contain a quantity of alumina $Al_2O_2$, the amount of which can vary, usually being about 0.5 to 5% of the silica.

The above-mentioned methods of forming the silica layer on the surface of the pigment particles have one feature in common, viz. that the silica is added as "active silica." When sodium silicate is acidified, silicic acid is formed, probably initially as orthosilic acid, $Si(OH)_4$. However, this product tends to polymerize by the reaction of two silanol groups.

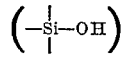

to form a siloxane group

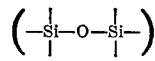

Under acidic conditions, this polymerization proceeds rapidly until a predominant proportion of the silanol groups present have been used up in the formation of siloxane bonds. The polymer thus formed has a high molecular weight and is defined as "inactive." Under the conditions of moderate alkalinity used in the examples above, there is a low degree of polymerization wherein the condensation between silanol groups has proceeded to only a limited extent leaving the silica in an "active" form which readily deposits on the surface of the particles present. It is not intended to imply that there is no polymerization nor that the process of polymerization is completely inhibited but, under the conditions specified, the silica is in a state of low polymerization and, thus "active," for a sufficient time to bring about deposition in the dense, amorphous form on the surface of the pigment particles.

The quantity of silica to be applied in the pigment treatment can be varied over a considerable range depending on the intended end use of the pigment. For use in baked coatings or extruded hot thermoplastic resins where relatively high temperatures are encountered, higher amounts, from 50 to 100 parts of the final pigment can be used with some advantage in resistance to the heat treatment, but with some loss in color properties. Amounts less than 10 parts per 100 show a noticeable improvement over the untreated product but may lack the desired heat resistance. For other uses, however, such products with low silica have real value, notably for resistance of coating compositions made therefrom to chemical treatment and to exposure to light.

Treatment of the pigment core to produce a layer of polymeric salt, salt on the substrate can be carried out in aqueous reaction media. The organic particles are dispersed in an aqueous solution of ionized polymer, such as an ammonia, amine or alkali metal salt of a poly (acrylic acid). The polymer may be precipitated directly onto the substrate surface by acidifying the polymer solution and subsequently reacted with an aluminum salt of a strong mineral acid. The preferred method for preparing a polycarboxylic salt layer is by forming the polyvalent metal salt on the pigment core *in situ* by adding a water-soluble salt of a polyvalent metal such as aluminum, chromium, etc. to an ionized water solution of the polycarboxylic acid polymer. The reaction between the polymer and the polyvalent metal ion produces an insoluble crosslinked material which deposits on the core. The water soluble salt of the polyvalent metal may be the sulfate phosphate, or halide of aluminum, chromium, barium, calcium or strontium. In the precipitation step, it is preferred that the amount of polyvalent metal salt reactant be added to give a stoichiometric ratio of about 1 to 3 equivalents acid per equivalent of metal ion.

The preferred carboxylic polymers include homopolymers, copolymers and interpolymers of $\alpha,\beta$-ethylenically unsaturated monomers having one or more —COOH groups. Typical monomers include acrylic acid, methacrylic acid, maleic half esters, crotonic acid, fumaric acid, itaconic acid, and mixtures of those with one another and with other copolymerizable unsaturated monomers having no deleterious functional groups. Typical comonomers include styrene and other benzenoid derivatives, nitriles, such as acrylonitrile, and lower alkyl esters of unsaturated acids. Hydroxy-substituted alkyl acrylic esters are suitable where hydrophllic groups other than carboxyl groups are desired. It is preferred that the addition polymer contain an equivalent of about 20–100% unsaturated acid monomer. The polymers can be made conventional free radical initiation procedures well known in polymer chemistry. It is preferred that the polymers contain sufficient carboxylic acid groups to give an acid value of at least 50 and preferably about 300 to 800. The polymers form a linear macromolecule having polyanionic characteristics when neutralized or solubilized with sodium hydroxide, potassium hydroxide, lithium hydroxide, ammonium hydroxide or amines such as morpholine, dimethyl amine, triethanol amine, triethylamine, etc. The addition polymers need not be fully neutralized to be effective. Sufficient base should be added to make a stable aqueous solution dispersion of the polycarboxylic acid resin. Usually 50–150% of the stoichiometeric equivalents of solubilizing base are satisfactory to produce the desired solution for slurrying the pigment particles. The solution may contain an amount of solubilized resin up to the saturation point of the solution at reaction temperature. About 1 to 10% polymer is usually satisfactory.

In addition to the polymers described above, condensation polymers may be useful for making water-soluble resins suitable for use herein. Those polyesters having pendant free carboxylic groups may be used. For instance a reaction product of trimellitic anhydride, isophthalic acid and a diol such as propylene glycol produces a polycarboxylic acid resin which can be solubilized with ammonia or alkali metal hydroxides.

The amount of polycarboxylic salt may vary considerably. As little as 5 parts per 100 parts of pigment core gives improved adhesion of the subsequent hydrated metal oxide layer. However, up to 100 parts of polycarboxylic salt may be beneficial, depending upon the relative thickness of the outer layer and the use to which the encapsulated product is put. Expressed as a weight ratio of intermediate layer to core, the coating may vary from about 0.05:1 to 1:1.

While the greatest amount of attention is devoted to these polymeric acids containing carboxylic acid groups, linear polymeric acids containing sulfonic acid groups may be also used. For instance, condensation products of formaldehyde and naphthalene sulfonic acid ("Darvan") or sulfonated polystyrene may be used. Unsaturated monomers containing sulfonic acid groups, such as the $\beta$-sulfonic derivative of ethyl acrylate, may also be used as a source of acid functional groups for building interpolymers by addition polymerization. These materials can be ionically crosslinked in much the same manner as polycarboxylic acids.

In the following examples all units are given in parts by weight unless otherwise stated.

Example 1

Toluidine red pigments presscake containing 25 parts by weight dry pigment with 55.3 parts water is dispersed with high shear agitation in a solution of 4.92 parts sodium salt of polyacrylic acid in 250 parts of water. The pigment has an average particle size of 1 micron. The polymer is a linear addition polymer, prepared by free radical initiation. To this is added incrementally 2.0 parts of aluminum sulfate in 80 parts water. This amount is equal to 0.70 equivalents Al per carboxyl group. A crosslinked salt of aluminum polyacrylate is precipitated on the pigment surface. The pigment is separated from the equeous reaction media by filtering and redispersed in 500 parts of water. The pigment dispersion is added slowly to a stirred solution of 47.2 parts sodium silicate (40° Bé consisting of 28.4% $SiO_2$ and 8.7% $Na_2O$) in 1250 parts water and agitated for about 1 minute. The pigment is separated from the aqueous phase by filtering, washed with water and redispersed in 1200 parts of water. The basicity of the slurry is adjusted to pH 10 with NaOH and the slurry is charged to a reaction vessel equipped with steam jacket. With agitation, the slurry is heated to about 90° C. and 1 part of a quaternary ammonium cationic surfactant is added. Simultaneously, 9.8 parts of 98.7% sulfuric acid diluted with water to a volume equivalent ot 330 parts of water, and 94.4 parts of 40° Bé. sodium silicate solution diluted with water to a volume equivalent to 330 parts of water are added slowly to the agitated slurry. The pH of the mixture is checked periodically and a small amount of sodium hydroxide solution may be added if necessary to adjust the pH to 9.5–10. The mixture is held at reaction temperature with stirring for about ½ hour. A dense hydrated silica coating is present on the pigment surface. The encapsulated pigment may be recovered by filtering, centrifuging, etc. The product may be dried for use in this form or it may be further treated by methods well known in the art. In this example the intermediate polyacrylate salt amounts to about 36 parts by weight per 100 parts of the pigment core and the silica outer layer amounts to about 45 parts per 100 parts core.

Example 2

The procedure of Example 1 is followed except that the treatment with crosslinked aluminum polyacrylate is omitted and the pigment is treated with aluminum acetate and silica according to U.S. Pat. No. 2,885,366. A dispersion of 12.5 parts toluidine red in about 125 parts water is made in a Waring Blendor to which is added 0.75 parts aluminum acetate and 0.02 parts barium acetate in 500 parts water. The dispersion is stirred for 6 minutes, filtered and washed with water. The pigment is redispersed in 600 parts water and stirred with 23.6 parts sodium silicate solution (40° Bé.) in 600 parts water in a reaction vessel for 15 minutes. The mixture is filtered and the presscake is washed with water. The pigment presscake is redispersed in 1200 parts water with a blender for 5 minutes and the pH is adjusted to 10 with $6N_{aq}$NaOH. The slurry is heated to 90° C. in a reaction vessel with 2 parts of quarternary ammonium cationic surfactant. Simultaneously, 9.8 parts of 98% sulfuric acid, diluted with water to a volume equivalent of 330 parts of water, and 47.2 parts of 40 Bé. sodium silicate solution, diluted with water to a volume equivalent to 330 parts of water, are added slowly to the agitated slurry, while maintaining the pH of the reaction mixture in the range of 9–10 by occasional addition of $6N_{aq}$. The mixture is stirred at about 90° C. for 1 hour, cooled and filtered. The pigment presscake is redispersed in 500 parts water for ½ hour, filtered and dried.

In comparative tests for solvent resistance, the encapsulated pigments of Examples 1 and 2 are compared with untreated toluidine red. A small amount of the pigment sample is contacted with xylene solvent at room temperature. Untreated toluidine red pigment dissolved at the fastest rate. Encapsulated pigment treated according to the prior art method of Example 2 dissolved at a slower rate than the untreated pigment, but was completely dissolved by xylene within 8 hours. The encapsulated pigment made according to Example 1 dissolved more slowly than the others, with substantial amounts remaining undissolved after 24 hours. Up to 40 hours is required to dissolve the novel encapsulated pigment in xylene, as compared to the prior art dissolution rate than is about 5 times faster for encapsulated pigment.

Example 3

The encapsulated pigment of Example 1 is dispersed in an organic coating vehicle by flushing in a laboratory scale sigma-blade mixer equipped with heat exchanged jacket and vacuum connections. To the flushing vessel is charged 140.9 parts of encapsulated toluidine red pigment as an aqueous presscake, (31.2% solids) 36 parts of a medium oil soya-modified glyceryl phthalate alkyd resin (50% resin solids, 50% volatile mineral spirits solvent), and 4.3 parts of aminated rosin flushing aid. The mass is pulped by mixing with sigma-blade agitator and warmed to about 50° C. To the flushed mass is added with mixing 12.8 parts of the alkyd resin, 2.9 parts turkey red oil, 8.5 parts of 65% lead acetate solution, and another 5 parts of alkyd resin. At this point about 10 parts of the aqueous phase breaks out of the flushed mass and is separated from the organic components by decanting. A second charge of 61 parts encapsulated pigment presscake and 35.3 parts alkyd resin is added and thoroughly mixed followed by another charge of 78.6 parts encapsulated pigment presscake and 27.0 parts alkyd resin. After further mixing, the following components are added in sequence: 8 parts barium chloride, 20 parts alkyd resin, 1 part turkey red oil, 4 parts 65% lead acetate solution, 3 parts aminated rosin, and 2 parts amino acid type surfactant (Armeen Z). After separation of the aqueous phase (30 parts) by decanting, the pigmented organic vehicle is washed by filling the flushing vessel with warm water and heating to 85° C. for about ½ hour to dissolve salts from the pigmented mass. The vessel is sealed and placed under vacuum for about 2 hours to remove water. After cooling, 2.5 parts alkyd resin, 1.2 parts 18% o-cresol antiskinning solution, and 52.6 parts mineral spirits are mixed with the flushed pigment mass.

The final composition of the pigmented vehicle is 16.1% toluidine red pigment core, 5.9% polyaluminum acrylate coating, 7.3% silica coating, 582.9% resin vehicle solids, and 17.8% volatiles.

Untreated toluidine red pigment is incorporated into the organic coating vehicle in a similar manner and the two pigmented vehicles are tested for bleed resistance. Films of test samples are drawn down on a panel and allowed to air dry. Bleed resistance is tested by painting a white pigmented overstripe of lacquer on the films and observing the color changes in the overstripe to detect bleeding of the pigment from the substrate film into the overstripe layer. The encapsulated pigment of Example 1 shows better bleed resistance than the untreated toluidine red pigment under this comparative test.

It appears that flushing as a procedure used for incorporating the encapsulated pigments is advantageous as compared to other methods. It is believed that conventional roll or shear type dispersing equipment results in fracturing of the encapsulation layers and resulting deterioration of the improved pigmentary qualities obtained by encapsulation of the organic core.

Post-treatment of the encapsulated pigments can be used in combination with the above-described steps. One such post-treatment is the deposition of alumina onto the outer hydrated metal oxide layer. This type of finishing step is known in the prior art and usually is accomplished by adding an aqueous solution of sodium aluminate to the reaction mixture after formation of the silica layer from aqueous media. Preferably, this treatment is effected subsequent to the acidification of an alkaline silicate solution by mineral acid.

Another post-treatment which is often beneficial to the precipitation of an organic moiety such as alkaline earth salts of rosin acids and long-chain fatty acids. Such treatments are described in the U.S. Pat. No. 3,470,007. The pigment slurry is rendered slightly alkaline (pH 8–9), and to this is added a separately prepared aqueous rosin soap solution, derived from hydrogenated rosin and sodium hydroxide. To the resulting slurry is then added an aqueous solution of a calcium salt, whereupon the calcium derivative of hydrogenated rosin is precipitated in the presence of the pigment slurry. The pigment is isolated by conventional filtration, washing, drying and pulverizing steps. The steps of drying and grinding may be omitted where desired, and the product may be used as aqueous paste or slurry in subsequent applications.

Various modification of the process are within the skill of the art to develop improved encapsulated organic pigments from untreated pigments. For instance, in the treatment of alkali blue by the above process, care should be exercised in controlling the pH in the range of about 6.0 to about 8.0. Higher pH tends to weaken the tinctorial power of the pigment during treatment of the core. Low pH during the formation of the hydrated silica layer promotes the formation of a gel structure in the silica, such gel structure being porous and generally undesirable.

While the invention has been described by reference to particular examples, there is no intent to limit the inventive concept except as set forth in the appended claims.

What is claimed is:

1. A pigment which comprises a solid organic core having a particle size in the range of about 0.1 to 10 microns; an intermediate layer of ionically crosslinked polymeric salt; and a skin of dense, hydrated, amorphous oxide of silicon, titanium or zirconium; said polymeric salt being formed *in situ* on the core by reaction of a water-soluble salt of a polymeric acid with a poly-valent metal compound.

2. The pigment of claim 1 wherein the polymeric acid consists essentially of a linear addition polymer of $\alpha,\beta$-ethylenically unsaturated carboxylic acid of at least about 50 acid value and wherein the polyvalent metal compound includes water-soluble compounds of aluminum, chromium, or alkaline earth metals.

3. The pigment of claim 2 wherein the skin consists essentially of hydrated silica.

4. The pigment of claim 1 wherein the weight ratio of intermediate layer to core is about 0.05:1 to 1:1; and wherein the weight ratio of skin to core is about 0.1:1 to 1:1.

5. The pigment of claim 1 wherein the core consists essentially of a water-insoluble organic solid selected from phthalocyanines, alkali blue, perylene red and azo pigments.

6. The pigment of claim 1 wherein the intermediate layer consists essentially of an aluminum polyacrylate or polymethacrylate in weight ratio to the core of about 0.2:1 to 0.5:1; and wherein the skin consists essentially of hydrated silica in weight ratio to the core of about 0.2:1 to 0.5:1.

7. The pigment of claim 1 wherein the polyvalent metal is aluminum, chromium, or alkaline earth metals.

8. The pigment of claim 7 wherein the organic core is toluidine red pigment.

9. A process for encapsulating organic pigment particles which comprises slurrying said particles in an aqueous reaction media containing a water-dispersible linear organic polycarboxylic resin having an acid value of at least about 50 and precipitating the resin onto the pigment surface by ionically crosslinking the resin with a polyvalent metal ion in situ, the amount of polycarboxylic salt reaction product being equal to about 5 to 100 parts per 100 parts by weight of said organic pigment particles;

separating the pigment and precipitate from the aqueous reaction media; and forming on the polycarboxylic salt a layer of dense hydrated oxide or hydroxide of silicon, titanium or zirconium, said layer being applied in an equal amount equal to about 10 to 100 parts by weight per 100 parts of said organic pigment particles.

10. The process of claim 9 wherein the polycarboxylic resin has an acid value of about 300 to 800.

11. The process of claim 10 wherein the polycarboxylic resin consists essentially of a linear addition polymer containing acrylic acid, methacrylic acid, maleic half esters, crotonic acid, fumaric acid, itaconic acid monomer or mixtures of these monomers with one another and with other copolymerizable unsaturated monomers.

12. The process of claim 11 wherein the polyvalent metal consists essentially of aluminum and wherein a layer of hydrated silicon oxide is formed on the polycarboxylic salt.

13. The process of claim 9 wherein the organic pigment consists essentially of phthalocyanines, alkali blue, perylene red or azo pigments.

14. The process of claim 9 wherein the organic pigment consists essentially of toluidine red having an average particle size in the range of about 0.5 to 5 microns, and wherein polycarboxylic salt reaction product consists essentially of an ionically crosslinked aluminum salt of polyacrylic acid having an acid value of about 300 to 800 and about 0.7 equivalents of Al per carboxyl equivalent.

15. The process of claim 14 wherein the polycarboxylic salt is deposited on the organic pigment particles by slurrying the organic pigment in an aqueous solution of polyacrylic acid at least partially neutralized with a water soluble base, and forming the aluminum salt by reacting the polyacrylic acid with a water soluble aluminum salt.

16. The process of claim 15 wherein a dense hydrated silica outer coating is deposited by slurrying the organic pigment having the polycarboxylic salt deposited thereon in an aqueous reaction medium and reacting an alkaline silicate solution with an aqueous mineral acid solution in the aqueous reaction medium.

17. In the process for encapsulating an organic pigment with dense hydrated silica, the improvement which comprises:

precipitating on the organic pigment an intermediate layer of ionically crosslinked polymeric salt which is the reaction product of a linear polymer having free acid groups and an acid value of least about 50 with a polyvalent metal compound, the amount of polymeric salt being in the range of about 5 to 100 parts organic pigment.

References Cited

UNITED STATES PATENTS

| | | | |
|---|---|---|---|
| 2,885,366 | 5/1959 | Iler | 106—300 |
| 3,219,476 | 11/1965 | Robbins | 252—316 |
| 2,969,330 | 1/1961 | Brynko | 252—316 |

DELBERT E. GANTZ, Primary Examiner

J. V. HOWARD, Assistant Examiner

U.S. Cl. X.R.

252—316; 106—288 Q